(12) United States Patent
Geiser

(10) Patent No.: US 7,673,439 B2
(45) Date of Patent: Mar. 9, 2010

(54) AGRICULTURAL MACHINE FOR SWATHING PRODUCTS LYING ON THE GROUND

(75) Inventor: Jens Geiser, Dettum (DE)

(73) Assignee: Kuhn S.A., Saverne (FR)

( * ) Notice: Subject to any disclaimer, the term of this patent is extended or adjusted under 35 U.S.C. 154(b) by 530 days.

(21) Appl. No.: 11/412,952

(22) Filed: Apr. 28, 2006

(65) Prior Publication Data

US 2006/0254244 A1    Nov. 16, 2006

Related U.S. Application Data

(63) Continuation of application No. PCT/FR2004/050520, filed on Oct. 21, 2004.

(30) Foreign Application Priority Data

Oct. 29, 2003  (FR) ................................. 03 12665

(51) Int. Cl.
*A01D 57/00*  (2006.01)
(52) U.S. Cl. .......................................... 56/192; 56/228
(58) Field of Classification Search .................. 56/192, 56/228, DIG. 21, 162, 177, 180–185, 193; 172/311

See application file for complete search history.

(56) References Cited

U.S. PATENT DOCUMENTS

| | | | | | |
|---|---|---|---|---|---|
| 1,927,458 | A | * | 9/1933 | Klise | ........................... 172/456 |
| 4,117,892 | A | * | 10/1978 | Dietrich et al. | ............. 172/311 |
| 4,402,367 | A | * | 9/1983 | Couser | ....................... 172/456 |
| 4,715,172 | A | * | 12/1987 | Mosby | ........................ 56/228 |
| 7,310,929 | B2 | * | 12/2007 | Dow et al. | .................... 56/192 |
| 2001/0008185 | A1 | | 7/2001 | Friggstad | |
| 2007/0240889 | A1 | * | 10/2007 | Neudorf et al. | ............. 172/311 |

FOREIGN PATENT DOCUMENTS

| | | | |
|---|---|---|---|
| CA | 2 313 362 A1 | | 1/2002 |
| DE | 201 13 172 U1 | | 12/2001 |
| EP | 406766 A1 | * | 1/1991 |
| EP | 0 872 170 A | | 10/1998 |
| EP | 1 108 352 A | | 6/2001 |

* cited by examiner

*Primary Examiner*—Alicia M Torres
(74) *Attorney, Agent, or Firm*—Oblon, Spivak, McClelland, Maier & Neustadt, L.L.P.

(57) ABSTRACT

An agricultural machine for grouping windrows together or for windrowing products lying on the ground includes a main frame supporting a central gathering and windrowing device and two side gathering and windrowing devices connected to support arms that extend laterally during work. Each of the side support arms is articulated relative to the main frame on a substantially vertical axis about which it is foldable at an angle of approximately 90° for transport and each of the side gathering and windrowing devices is articulated on its support arm around a substantially horizontal axis about which it is foldable upwards at an angle of approximately 90° to obtain a reduced machine width for transport.

12 Claims, 6 Drawing Sheets

AGRICULTURAL MACHINE FOR SWATHING PRODUCTS LYING ON THE GROUND

CROSS REFERENCE TO RELATED APPLICATIONS

The present application is a continuation of PCT application Serial No. PCT/FR04/050520, filed on Oct. 21, 2004, which claims priority to FR 03/12665, filed on Oct. 29, 2003, the contents of each of which are incorporated herein by reference.

BACKGROUND OF THE INVENTION

1. Field of the Invention

The present invention relates to an agricultural machine for grouping windrows together or for windrowing products such as grass, hay or straw that are lying on the ground. This machine comprises in particular a main frame supporting a central gathering and windrowing device that is connected to said main frame and two side gathering and windrowing devices that are connected to support arms that extend laterally relative to the main frame, which side devices and central device are substantially in line and extend substantially perpendicular to the direction of travel of the machine during work.

2. Discussion of the Background

On a machine of this kind, the side gathering and windrowing devices may be folded upward for transport, by means of their support arms, about substantially horizontal axes. This arrangement makes it possible to reduce the width of the machine in order to further displacements on tracks and roads. However, in this position, the height of the machine is considerably increased. This hampers rearward visibility and impairs the stability of the machine due to the distance of its center of gravity from the ground. It then risks overturning when passing over major unevennesses or in a bend.

SUMMARY OF THE INVENTION

The object of the present invention is to overcome the aforementioned drawbacks. It must notably propose a machine that is as described in the introduction and that can be transposed simply into a transport position in which it retains good stability.

Accordingly, an important feature of the invention lies in the fact that each side support arm of a side gathering and windrowing device is articulated relative to the main frame on a substantially vertical axis about which it can be folded at an angle of approximately 90° into a transport position in which said side gathering and windrowing devices are situated either side of the central gathering and windrowing device and that each side gathering and windrowing device is articulated on its support arm by means of a substantially horizontal axis directed substantially perpendicular to the direction of travel in the working position, about which axis it can be folded upward at an angle of approximately 90° for transport.

This arrangement makes it possible to fold the side gathering and windrowing devices into a position in which they are directed in the direction of travel and in which their width is reduced. In this position, the machine is compact. Its narrow width makes it possible to move it on roads and its center of gravity that remains relatively low gives it good stability.

According to another feature of the invention, the frame comprises mechanisms for immobilizing the side gathering and windrowing devices in the transport position. Each of these immobilization mechanisms consists advantageously of an arm that is rigidly fastened to the frame and on which is articulated a hook actuated by a system of levers. This system forms an articulation of the knuckle-joint type that is controlled by means of a hydraulic cylinder.

BRIEF DESCRIPTION OF THE DRAWINGS

Other features and advantages of the invention will emerge from the following description that refers to the appended drawings which represent, as a nonlimiting example, an embodiment of the machine according to the invention.

In these drawings.

DESCRIPTION OF THE PREFERRED EMBODIMENTS

Figure 1:
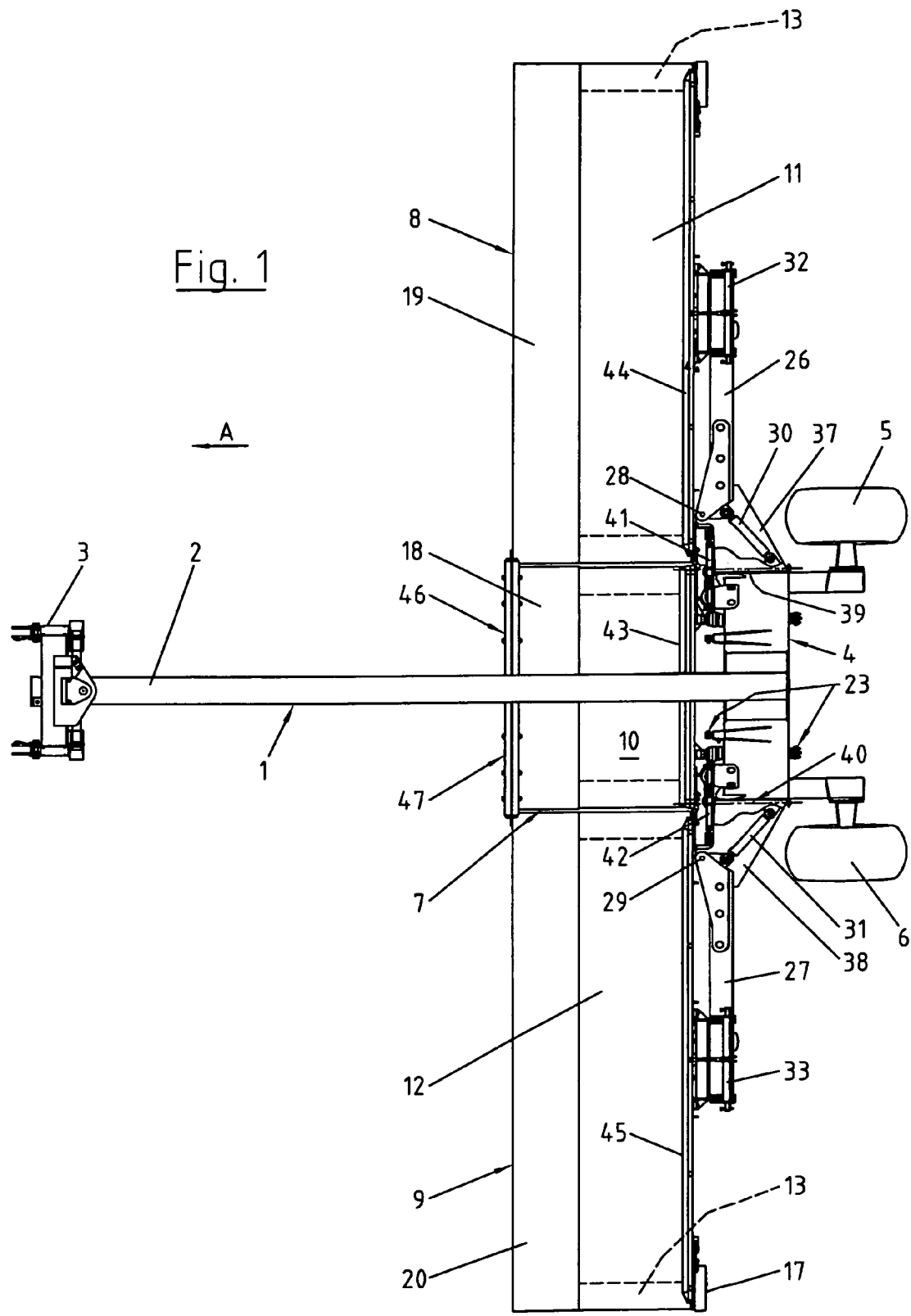
FIG. 1 represents a top view, with partial sections, of a machine according to the invention in the working position.

As represented in FIG. 1, the machine according to the invention comprises a main frame 1. The latter consists of a central beam 2 which has at its front end a coupling head 3 for coupling it to a tractor making it possible to drive and move the machine in the direction of travel A. The beam 2 has at its rear end a cross bar 4 to which are connected two displacement wheels 5 and 6 which rest on the ground. Said cross bar 4 supports a central gathering and windrowing device 7 and two side gathering and windrowing devices 8 and 9. The latter are substantially in line and extend substantially perpendicular to the direction of travel A during work.

In the example shown, the gathering and windrowing devices 7, 8 and 9 comprise conveyor belts 10, 11 and 12 for windrowing. The latter are guided on rollers 13 that are supported by support frames 14 provided with wheels 15 and 16. These rollers 13 may be driven in rotation by means of hydraulic motors 17 in order to move the conveyor belts 10, 11 and 12 to the right or to the left.

The gathering and windrowing devices 7, 8 and 9 also comprise pick-ups 18, 19 and 20 to gather the products lying on the ground. The latter are situated in front of the conveyor belts 10, 11, 12 and are attached to the support frames 14. Each pick-up 18, 19, 20 has rake tines 21 that are driven in rotation about a horizontal axis 22 in order to gather the forage lying on the ground and place it on the corresponding conveyor belt 10, 11 or 12. This drive may be provided by means of a hydraulic motor not shown.

Said drive of the conveyor belts 10, 11 and 12 and of the pick-ups 18, 19, 20 may also be provided by mechanical means connected to a power take-off shaft of the tractor.

The central gathering and windrowing device 7 is connected to the main frame 1 by means of a lifting mechanism 23. The latter consists of hydraulic cylinders 24 and levers 25. The latter are articulated on said device 7 and on the main frame 1 and are arranged in the shape of parallelograms. The hydraulic cylinders 24 are connected to the frame 1 and act on the levers 25 so as to move the central gathering and windrowing device 7 up and down.

Each side gathering and windrowing device 8, 9 is connected to a support arm 26, 27 which extends laterally relative to the main frame 1. As emerges in particular from FIGS. 1 and 5, each side support arm 26, 27 is articulated relative to the frame 1 on a substantially vertical axis 28, 29. It can be folded about this axis 28, 29 at an angle of approximately 90° forward for transport, by means of a hydraulic cylinder 30, 31 that is situated between the frame 1 and the corresponding support arm 26, 27.

Each side gathering and windrowing device 8, 9 is articulated on its support arm 26, 27 by means of an axis 32, 33 that is substantially horizontal and substantially perpendicular to the direction of travel A in the working position. Each axis 32, 33 is situated above the corresponding support arm 26, 27. Each one is guided into lugs 34 that are attached to the top face of said support arm 26, 27. Finally, each side gathering and windrowing device 8, 9 comprises, on its rear side, bent lugs 35 that are articulated on these axes 32 and 33.

Figure 2:
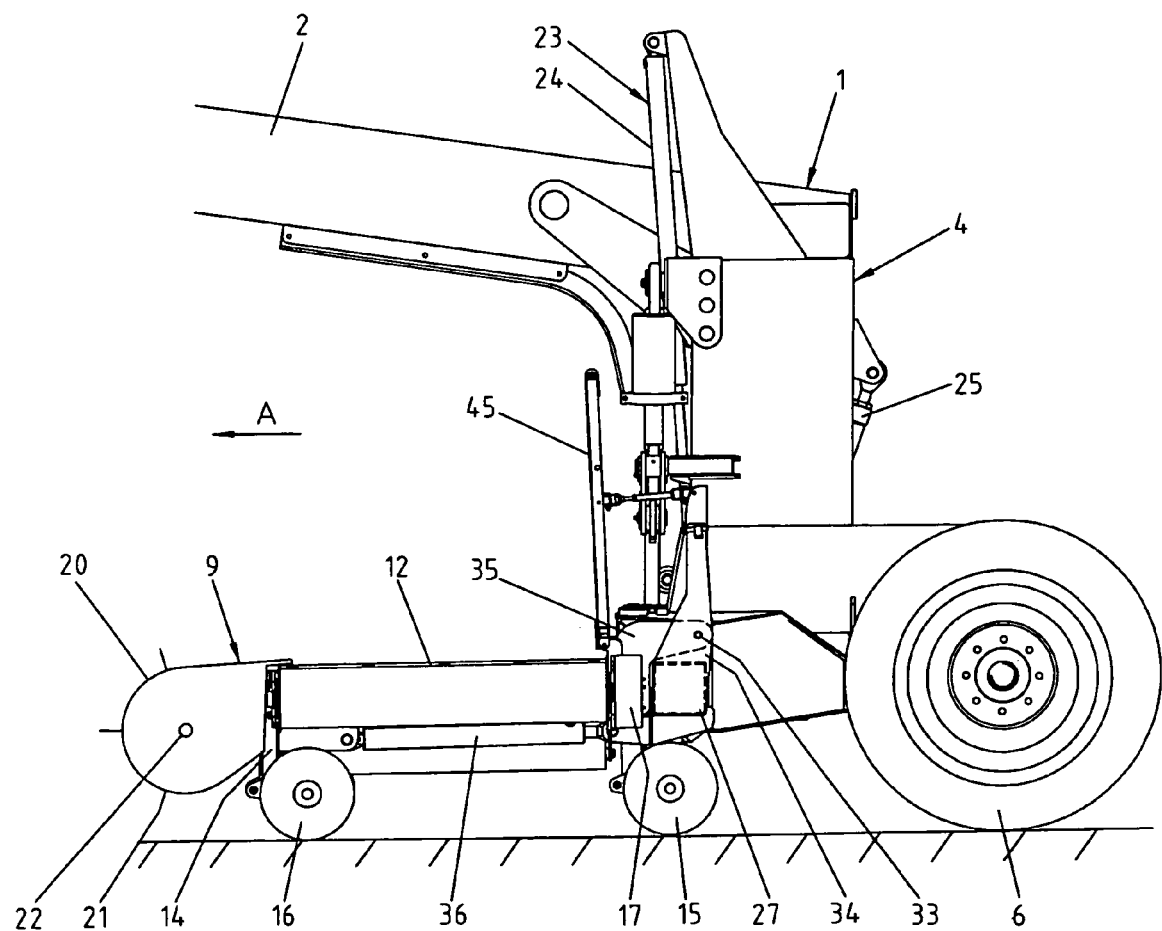
FIG. 2 represents a side view, on a larger scale, of a side gathering and windrowing device in the working position.
Figure 3:
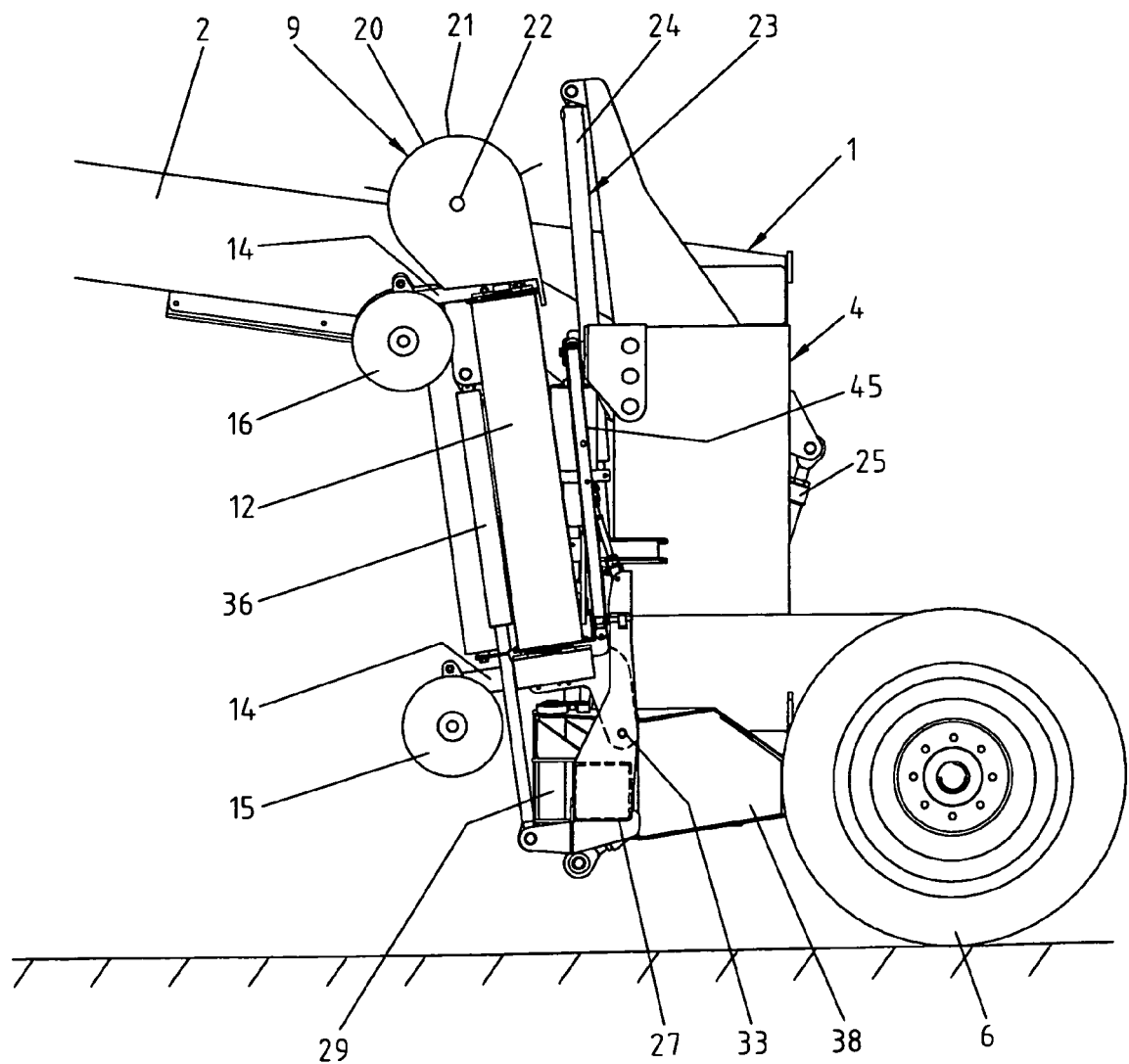
FIG. 3 represents a view similar to that of FIG. 2 with the side gathering and windrowing device raised.

Each side gathering and windrowing device 8, 9 can be moved about its axis of articulation 32, 33 with the support arm 26, 27 by means of a hydraulic cylinder 36 that is situated beneath said device 8, 9. Said hydraulic cylinder 36 is connected to the corresponding frame 14 and support arm 26, 27 (see FIGS. 2 and 3).

The substantially vertical axis of articulation 28, 29 of each support arm 26, 27 is situated behind the corresponding side gathering and windrowing device 8, 9 and in the vicinity of its end closest to the central gathering and windrowing device 7. Each of said axes of articulation 28, 29 is housed in the top and bottom walls of a side beam 37, 38 of the main frame 1 (see FIGS. 1 and 5). The hydraulic cylinders 30, 31 provided to fold the support arms 26, 27 about the axes of articulation 28, 29 are advantageously housed in said side beams 37, 38. They are articulated at one of their ends on one of the walls of this beam 37, 38 and at their other end on the corresponding support arm 26, 27. Each side beam 37, 38 comprises a pivot axis 39, 40 that is substantially horizontal and directed in the direction of travel A. This axis allows each side gathering and windrowing device 8, 9 and the corresponding support arm 26, 27 to move heightwise for example to follow the ground unevennesses. A hydraulic cylinder 41, 42 may be associated with each side beam 37, 38 in order to be able to lift the corresponding gathering and windrowing device 8, 9 if there is a larger obstacle to pass.

At the rear of the conveyor belts 10, 11 and 12 are arranged deflectors 43, 44 and 45 for the guidance of the products. These deflectors 43, 44 and 45 are articulated on the frames 14 and can be moved from a position substantially perpendicular to the conveyor belts 10, 11 and 12 in work into a position substantially parallel to said conveyor belts in transport.

Figure 4:
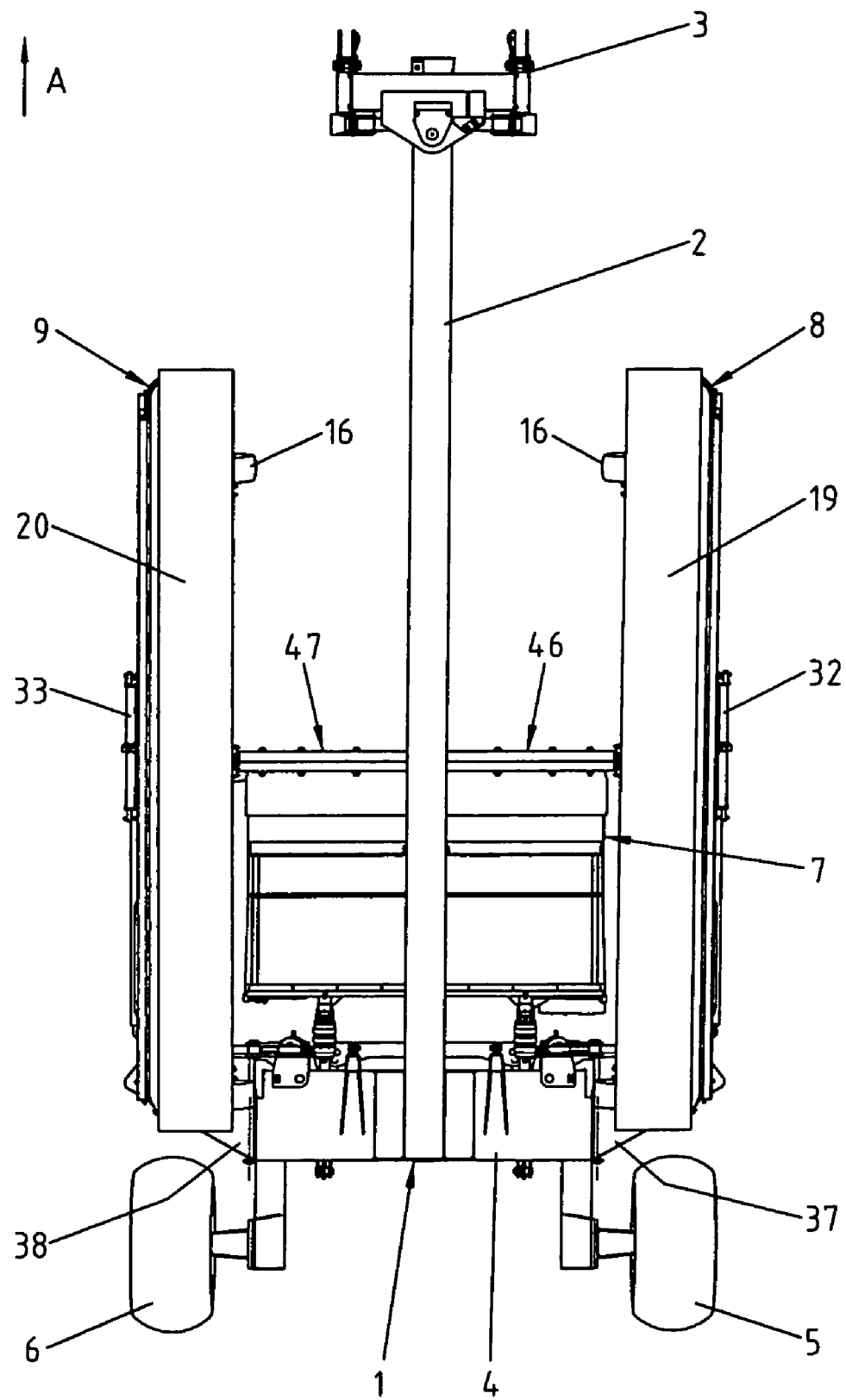
FIG. 4 represents a top view of the machine according to the invention in the transport position.
Figure 6:
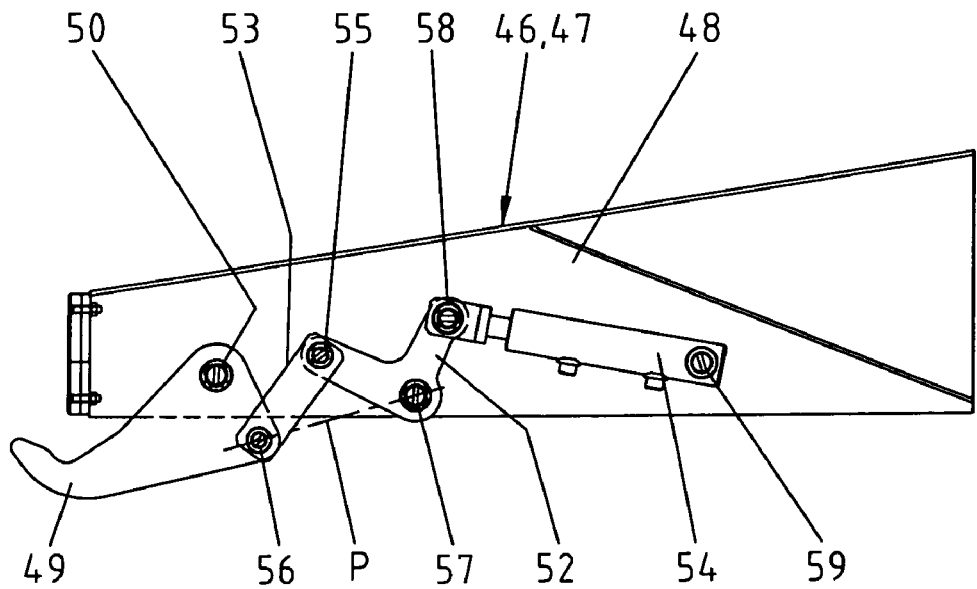
FIG. 6 represents a detail view of an immobilization mechanism in the released position.

The main frame 1 comprises mechanisms 46 and 47 for the immobilization of the side gathering and windrowing devices 8 and 9 in the transport position. As is shown in FIG. 4, these mechanisms 46 and 47 extend either side of the central beam 2 and connect the side gathering and windrowing devices 8 and 9 to this central beam 2 in transport and for setting down. Each of these mechanisms 46 and 47 consists of an arm 48 that is rigidly fastened to the central beam 2 of the frame 1 and on which a hook 49 is articulated by means of an axis 50 (see FIGS. 6 and 7). This hook 49 hooks onto a shackle 51 provided on the corresponding side gathering and windrowing device 8, 9 in order to immobilize the latter. For this purpose, the hook 49 may be moved about the axis 50 by a system of levers 52, 53 controlled by means of a hydraulic cylinder 54. The system of levers 52, 53 forms an articulation of the knuckle-joint type which is self-locked in the position of immobilization of the side gathering and windrowing devices 8 and 9. It comprises a first lever 52 that is bent and a second straight lever 53 that are articulated with one another by means of an axis 55. Said straight lever 53 is also articulated on the hook 49 by means of an axis 56. The bent lever 52 is articulated on the corresponding arm 48 by means of an axis 57 and on the rod of the hydraulic cylinder 54 by means of an axis 58. The body of said hydraulic cylinder 54 is, for its part, articulated on the corresponding arm 48 by means of an axis 59.

Figure 7:
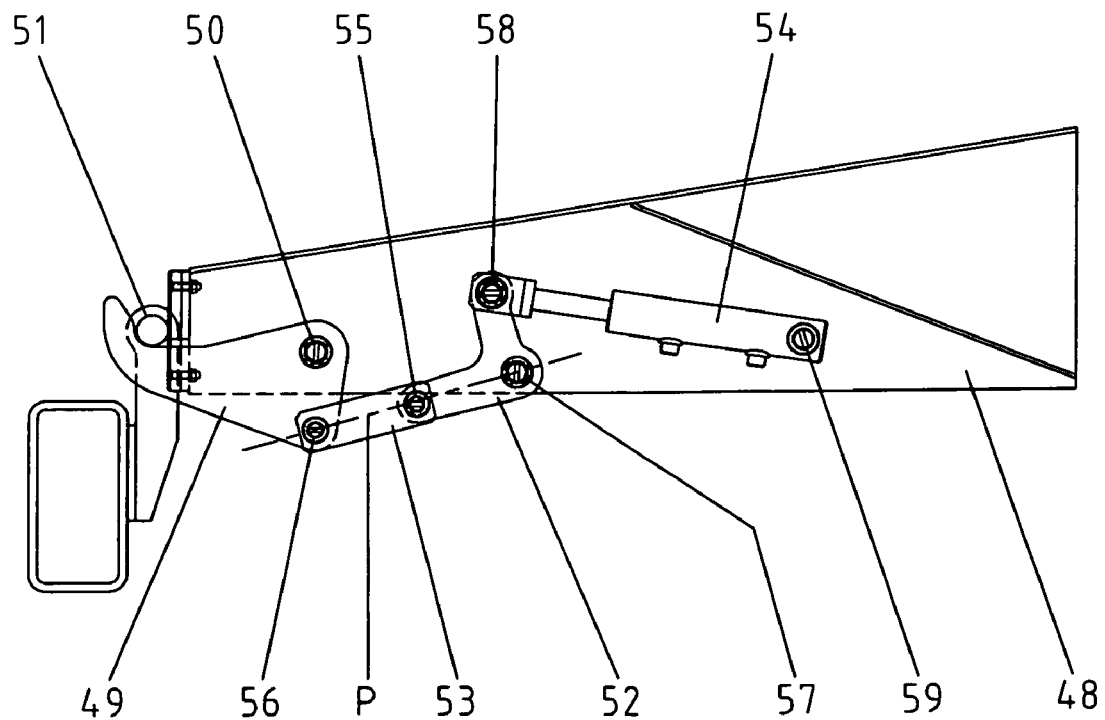
FIG. 7 represents a detail view of the immobilization mechanism in the locked position.

FIG. 7 shows that the arrangement of the axes of articulation 55, 56 and 57 of the levers 52 and 53 is such that, when the immobilization device is in the locked position, the axis of articulation 55 between the two levers 52 and 53 is situated beneath a plane P passing through the other two axes of articulation 56 and 57 of said levers 52 and 53. In this position, the hook 49 is held in the locked position by the levers 52 and 53, independently of the action of the hydraulic cylinder 54. In the unlocked position (FIG. 6), the axis of articulation 55 between the two levers 52 and 53 is situated above the plane P. This position is obtained by pulling on the bent lever 52 by means of the hydraulic cylinder 54 in order to make it pivot on its axis of articulation 57. The axis of articulation 55 and the second lever 53 then move upward and drive the hook 49 that they cause to rotate about its axis of articulation 50 so that its end disengages downward. The return to the locked position is achieved by exerting a pressure on the first lever 52 with the hydraulic cylinder 54 so that the levers 52 and 53 move in a manner converse to that described hereinabove.

The hydraulic cylinders 24, 30, 31, 36, 41, 42 and 54 of the machine are advantageously connected to the hydraulic system of the tractor by means of pipes and may be controlled from the latter.

During work, the machine is coupled to a tractor which drives it and moves it in the direction of travel A. The central gathering and windrowing device 7 is lowered by means of the lifting mechanism 23 so that its wheels 15 and 16 move over the ground. The support arms 26 and 27 and the side gathering and windrowing devices 8 and 9 extend either side of the central beam 2. The wheels 15 and 16 of said devices 8 and 9 also move over the ground. The three gathering and windrowing devices 7, 8 and 9 are then substantially in line and extend substantially perpendicular to the direction of travel A. Their pick-ups 18, 19 and 20 are driven so that the rake tines 21 gather the forage lying on the ground and deposit it on the conveyor belts 10, 11 and 12. The latter are driven so that they move this forage laterally, transmitting it from one to the other without it returning to the ground and depositing it on one of the sides of the machine in the form of a large volume windrow. The direction of displacement of the conveyor belts 10, 11 and 12 may be chosen according to the side on which the forage is to be deposited.

It is also possible to raise the central gathering and windrowing device 7 by means of the lifting mechanism 23 and to work only with the side devices 8 and 9. Their conveyor belts 11 and 12 may then be driven in the reverse direction so that they move the forage toward the middle of the machine to form a central windrow.

Figure 5:
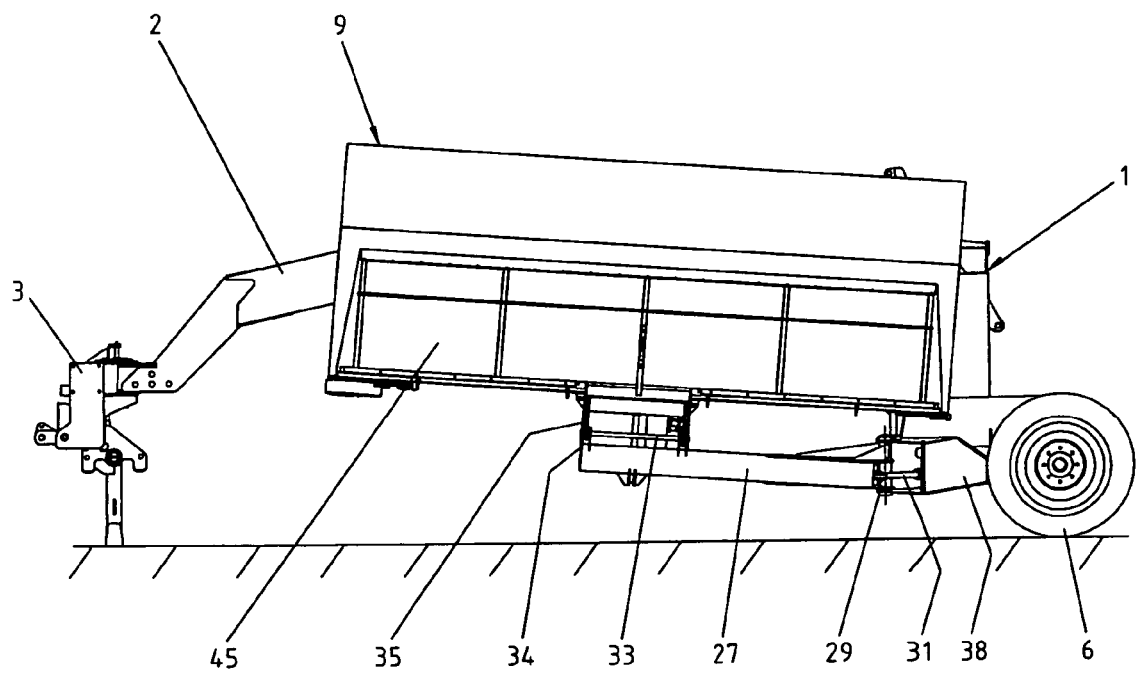
FIG. 5 represents a side view of the machine according to the invention in the transport or setting down position.

For transport, the central gathering and windrowing device 7 is raised with the lifting mechanism 23 in order to move it away from the ground. Then the side gathering and windrowing devices 8 and 9 are pivoted by means of hydraulic cylinders 36 about their axes of articulation 32 and 33 to a substantially vertical position. They are then situated substantially above the support arms 26 and 27. The latter are then folded forward, by means of the hydraulic cylinders 30 and 31, to a position in which they are directed in the direction of travel A. The side gathering and windrowing devices 8 and 9 are then substantially parallel to the central beam 2 of the frame 1 and are situated on either side of the central gathering and windrowing device 7. The width of the machine is thus considerably reduced and its ground clearance is sufficient for displacements on tracks and roads (FIGS. 4 and 5).

In this transport position, the side gathering and windrowing devices 8 and 9 are locked relative to the frame 1 by means of the immobilization mechanisms 46 and 47. Before these side devices 8 and 9 reach the transport position, the hooks 49 are held down in the unlocked position by the levers 52 and 53 and the hydraulic cylinders 54 that are in the closed position (see FIG. 6). When said side devices 8 and 9 reach the vicinity of the arms 48, the hydraulic cylinders 54 are actuated so that they extend. As a result, they push the levers 52 and 53 downward so that the latter move the hooks 49 upward so that they hook onto the yokes 51 provided on the side devices 8 and 9 (see FIG. 7). Thanks to the arrangement of the levers 52 and 53 in this position, the latter hold the hooks 49 in the locked position even if the hydraulic pressure were to diminish in the cylinders 54 due to a leak for example.

For the return to the working position, the hydraulic cylinders 54 are operated so that they disengage the hooks 49 downward. Then, the support arms 26 and 27 may be pivoted outward and rearward by the hydraulic cylinders 30 and 31 and the gathering and windrowing devices 8 and 9 may be lowered to the ground by means of the hydraulic cylinders 36. The actions of these various hydraulic cylinders 24, 30, 31, 36 and 54 may be initiated automatically with the aid of control valves controlled from detectors of the positions of the support arms 26 and 27 and of the gathering and windrowing devices 7, 8 and 9.

It is evident that the invention is not limited to the embodiments described and shown in the appended drawings. Modifications remain still possible, particularly as concerns the constitution of the various elements or by substitution of technical equivalents, without, for all that, departing from the field of protection.

What is claimed as new and desired to be secured by Letters Patent of the United States is:

1. An agricultural machine for grouping windrows together or for windrowing products such as grass, hay or straw that are lying on the ground, comprising:
    a main frame supporting:
    a central gathering and windrowing device that is connected to said main frame by a lifting device;
    two side gathering and windrowing devices that are connected to support arms that extend laterally relative to the frame, which side devices and central device are substantially in line and extend substantially perpendicular to the direction of travel of the machine during work;
    wherein each side support arm of a side gathering and windrowing device is articulated relative to said frame on a substantially vertical axis about which it is foldable at an angle of approximately 90° into a transport position in which said side gathering and windrowing devices are situated on either side of the central gathering and windrowing device;
    wherein each side gathering and windrowing device is articulated on its support arm via a substantially horizontal axis directed substantially perpendicular to the direction of travel in the working position, about which horizontal axis of articulation it is foldable upwards at an angle of approximately 90° for transport; and
    wherein the substantially vertical axis of articulation of each side support arm is situated at the rear of the corresponding side gathering and windrowing device and in the vicinity of an end of the respective side support arm closest to the central gathering and windrowing device.

2. The machine as claimed in claim 1, wherein the substantially horizontal axis of articulation of each side gathering and windrowing device is situated above the corresponding support arm.

3. The machine as claimed in claim 2, wherein each side gathering and windrowing device can be moved about its substantially horizontal axis of articulation by means of a hydraulic cylinder arranged between said device and the corresponding support arm.

4. The machine as claimed in claim 3, wherein the hydraulic cylinder is situated beneath the corresponding side gathering and windrowing device.

5. The machine as claimed in claim 1, wherein the substantially vertical axis of articulation of each side support arm is situated on a side beam of the frame, which side beam is articulated on a substantially horizontal axis and directed in the direction of travel.

6. The machine as claimed in claim 1, wherein each side support arm is movable about its substantially vertical axis of articulation via a hydraulic cylinder.

7. The machine as claimed in claim 1, wherein the frame comprises mechanisms for immobilizing the side gathering and windrowing devices in the transport position.

8. The machine as claimed in claim 7, wherein each immobilization mechanism includes an arm that is rigidly fastened to the frame and on which is articulated a hook actuated by a system of levers controlled by a hydraulic cylinder.

9. The machine as claimed in claim 1, wherein each side support arm of each side gathering and windrowing device is foldable forwardly at an angle of approximately 90° about the substantially vertical axis into the transport position.

10. The machine as claimed in claim 9, wherein the side support arm of each side gathering and windrowing device is positioned below the respective side gathering and windrowing device when the machine is in the transport position.

11. The machine as claimed in claim 9, wherein an end of each side gathering device that is farthest from the central gathering and windrowing device during work is positioned in farther forward, relative to the direction of travel, than is the central gathering and windrowing device while the machine is in the transport position.

12. An agricultural machine for grouping windrows together or for windrowing products such as grass, hay or straw that are lying on the ground, comprising:
    a main frame supporting:
    a central gathering and windrowing device that is connected to said main frame by a lifting device;
    two side gathering and windrowing devices that are connected to support arms that extend laterally relative to the frame, which side devices and central device are substantially in line and extend substantially perpendicular to the direction of travel of the machine during work;
    wherein each side support arm of a side gathering and windrowing device is articulated relative to said frame on a substantially vertical axis about which it is foldable at an angle of approximately 90° into a transport position in which said side gathering and windrowing devices are situated on either side of the central gathering and windrowing device;
    wherein each side gathering and windrowing device is articulated on its support arm via a substantially horizontal axis directed substantially perpendicular to the direction of travel in the working position, about which horizontal axis of articulation it is foldable upwards at an angle of approximately 90° for transport;

wherein the frame comprises mechanisms for immobilizing the side gathering and windrowing devices in the transport position;

wherein each immobilization mechanism includes of an arm that is rigidly fastened to the frame and on which is articulated a hook actuated by a system of levers controlled by a hydraulic cylinder; and wherein the system of levers forms an articulation of the knuckle-joint type which is self-locked in the position of immobilization of the side gathering and windrowing devices.

* * * * *